(12) United States Patent
Shafer et al.

(10) Patent No.: US 11,881,718 B2
(45) Date of Patent: Jan. 23, 2024

(54) GLOBAL INTERFACE SYSTEM

(71) Applicants: Robert Allen Shafer, Wichita, KS (US); Jessie James Shafer, Andover, KS (US)

(72) Inventors: Robert Allen Shafer, Wichita, KS (US); Jessie James Shafer, Andover, KS (US)

(*) Notice: Subject to any disclaimer, the term of this patent is extended or adjusted under 35 U.S.C. 154(b) by 0 days.

(21) Appl. No.: 16/234,245

(22) Filed: Dec. 27, 2018

(65) Prior Publication Data
US 2019/0288558 A1   Sep. 19, 2019

Related U.S. Application Data

(60) Provisional application No. 62/644,374, filed on Mar. 16, 2018.

(51) Int. Cl.
*H02J 50/12* (2016.01)
*H02N 11/00* (2006.01)
(Continued)

(52) U.S. Cl.
CPC ............... *H02J 50/12* (2016.02); *C04B 2/04* (2013.01); *H02N 11/00* (2013.01); *H02N 99/00* (2013.01)

(58) Field of Classification Search
CPC .......... H02J 50/12; H02J 50/20; H02J 50/402; H02J 50/70; H02J 50/80; H02J 50/90;
(Continued)

(56) References Cited

U.S. PATENT DOCUMENTS

| 7,808,236 B1* | 10/2010 | Huang ................... H01L 41/00 324/109 |
| 8,796,886 B2* | 8/2014 | Tan ...................... H04B 5/0081 307/104 |

(Continued)

OTHER PUBLICATIONS

Byron et al.; An RF-Gated Wireless Power Transfer System for Wireless RRI Receive Arrays; Concepts Magn Reson Part B Magn Reson Eng.; Department of Electrical Engineering, Stanford University, Stanford, CA; Oct. 2017. (Year: 2017).*

(Continued)

*Primary Examiner* — Daniel J Colilla

(57) ABSTRACT

The invention comprises a free and renewable energy source and method for generating a superimposed magnetic field, for establishing a resonant magnetic field interface with the electromagnetic field generated by an external dipole energy source, whereby, the energy extracted from the superimposed magnetic field is converted to usable energy and distributed to the desired load. Whereby, said generated superimposed magnetic field is precisely tuned to a desired resonance frequency by variable resistance and capacitance comprised of controlled inorganic chemical reactions and magnetics. The invention creates an autonomous, secure, efficient, and effective power system designed to generate megawatts of power through extracting energy from carrier waves synchronized to the proton precision frequencies and distribute the generated power through existing power distribution stations or autonomous microgrids. Thereby, eliminating dependance on the conventional centralized power grid while providing safeguards ensuring current and future power requirements are satisfied.

7 Claims, 8 Drawing Sheets

Global Interface System Simplified Connection Block Diagram

(51) Int. Cl.
*H02N 99/00* (2006.01)
*C04B 2/04* (2006.01)

(58) Field of Classification Search
CPC ........ H02J 7/02; H02J 7/48; H02J 7/46; H02J 1/007; H02N 11/002
See application file for complete search history.

(56) References Cited

U.S. PATENT DOCUMENTS

| | | | |
|---|---|---|---|
| 2016/0087685 A1* | 3/2016 | Brumley | H02J 7/0063 320/136 |
| 2017/0005466 A1* | 1/2017 | Nakano | G06F 1/28 |
| 2017/0288460 A1* | 10/2017 | Yao | H02J 50/12 |
| 2019/0237980 A1* | 8/2019 | Yang | H01M 2/10 |

OTHER PUBLICATIONS

Author: Armored; Coral Castle Forums; "This one is for all of you who sit and wonder."; published Apr. 2003; source unknown. (Year: 2003).*

* cited by examiner

Global Interface Power Module Simplified Model

Quicklime-Catalyst Variable Resistance Tuning

Global Interface System Simplified Connection Block Diagram

Global Interface System Quicklime Induction Circuit

Global Interface System Stator Circuit Diagram

Global Interface System Electrical Circuit Diagram

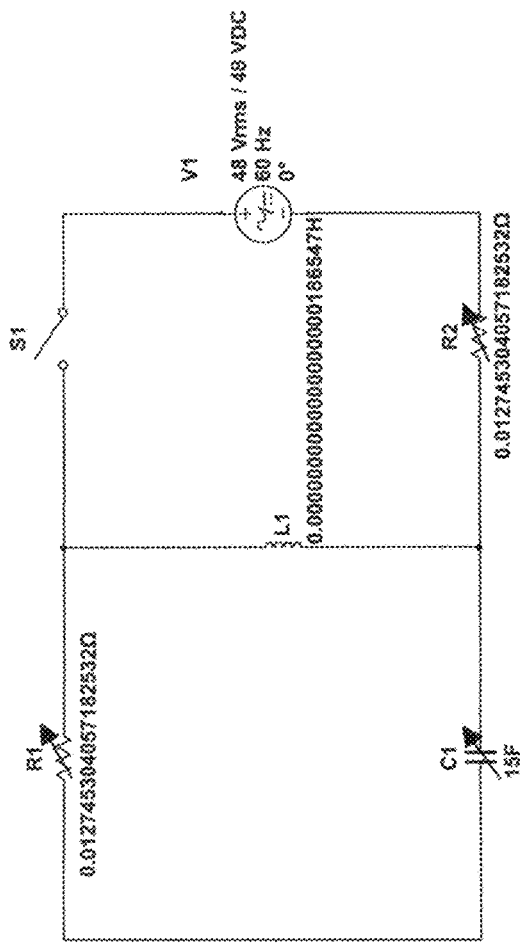

For L1 inductance three different methods to choose from:

Broadside Coupled trace induction calculator
Trace Width W .855000000 inch
Trace Seperation H .01 inch
Trace Length L .05 inch
Relative permeability ur 1
Inductance: 1.87e-20 H Coax inductance calculator:
outer diameter D 270000 inch
inner diameter d .269999.999 inch
length of wire .001 inch
relative permeability ur 1
Inductance: 1.88e-20 H Edge coupled trace inductance calculator:
trace width W 1710000 inch
trace seperation S .001 inch
trace length L .01 inch
relative permeability ur 1
inductance: 1.87e-20 H For R1 and R2 resistors both can be made with quicklime with copper as a conductive material inside the copper will leach when quicklime is wet, or can be cathoded and anoded to create a faster particulate saturation thereby when the quicklime dries out to the desired resistance the resistor can be sealed.

For Coax inductance calculation the same principle applies, to inner and outer diameter, to make the size smaller, the length of wire can become thinner than .001 of a inch by copper added to the quicklime, in the same manner as R1 and R2. As copper particle size is Cu Copper picometer (pm) with an accuracy of 5 pm. Cu=135 picometers = 5.315e-9 the diameter of the coax inductance calculator shrinks significantly by shrinking the particle size with the anode and cathode method.

Figure 7
Global Interface System Schematic

Global Interface System Thermionic Emission Electron Bunching

GLOBAL INTERFACE SYSTEM

CROSS-REFERENCE TO RELATED APPLICATIONS

This application is related to and claims priority to U.S. Provisional Application No. 62/644,374, entitled "Global Interface System" (Shafer) filed Mar. 16, 2018.

FIELD OF INVENTION

The apparatus relates to the field of free and renewable energy sources establishing a synchronized magnetic resonance interface with the Earth's electromagnetic field(s) (EMF) by generating resonant carrier waves corresponding to the Earth's EMF surface waves to wirelessly transmit power from the transmitter (source) to the receiver (load). More specifically, the apparatus comprises a system and method to create a reliable, robust, and efficient wireless power grid, incorporating autonomous micro-grids, eliminating the need for the current conventional "wired" power grid, which is susceptible to increased risks of catastrophic failures causing widespread power outages.

BACKGROUND OF THE INVENTION

The power grid, a single machine serving as a complex electrical network system, is comprised of power plants, transmission lines, substations, transformers, and loads. In which, the transmission lines interconnect power generators (sources) with their respective loads (consumers). Thus, creating a wired electrical network, a macro-grid, and establishing an electrical path for energy to flow throughout grid. The conventional wired electrical network is operating beyond the intended design specifications and lifecycle. Consequently, the probability of increased risk of catastrophic failures, potentially leading to long periods of widespread power outages, intensifies. The highlighted proposed failures are linked to grid vulnerabilities associated with the following: the grid's physical composition, increased power demand, natural disasters, physical and cyber threats.

The highlighted proposed failures are linked to grid vulnerabilities associated with the following: aging, the grid's physical composition, excessive power demand, natural phenomenon, electromagnetic pulse (EMP) attack, physical and cyber threats. Aging, physical composition, and excessive power demands have caused blackouts to occur at four times the rate compared to the rate fifteen years ago. Additionally, the aging and physical structure of components, particularly transmission lines, are inefficient based on current and future power demand, significantly increasing the costs to construct and maintain these components to transmit reliable and efficient power from the source to the load. Additionally, natural disasters, including catastrophic outages from hurricanes and tsunamis, approximate for nearly 70% of system outages, compared to approximately 20% occurrence over a decade ago. Furthermore, increased threats from EMP, physical, and/or cyber-attacks create challenges for the United States and other countries to protect against such threats. Scientists suggest that an EMP attack or natural phenomenon, such as a solar disturbance, could disable an entire electrical power system, as the transmission lines serve as the conductor of the disturbance, spreading the disturbance throughout the macro grid, causing a catastrophic cascading effect.

Significant scientific progress has been made in the design and development of wireless technology to launch power from generators to loads using electromagnetic surface waves, particularly Zenneck surface waves. Theoretically, Zenneck surface waves contain robust physical characteristics contributing to their overall efficiency, reliability, and security, which are design characteristics required by the power grid. The introduction of wireless technology promotes the use of micro-grids to generate and transmit power, reducing the risks associated with the conventional wired network utilizing a centralized macro-grid platform, by creating autonomous micro-grid network architectures. Hence, the independent, micro-grid, architectures will be impervious to cascading effects creating widespread power outages, as the need for the wired network architecture is reduced and eventually eliminated.

What is needed is an autonomous, secure, efficient, and effective power system designed to generate megawatts of power through carrier waves synchronized to Earth's proton precision frequencies and distribute the generated power through exiting power distribution stations or atonomous microgrids, eliminating dependance on the conventional centralized power grid, while providing safeguards, ensuring current and future power requirements are satisfied.

What is a needed is a radio frequency (RF) tuner capable of synchronizing the frequency of the oscillating field produced within the wireless power system with the Earth's dynamic electromagnetic field, establishing a waveguide between the Earth and the power system, whereby decay of the carrier waves being generated and transmitted from the power system through the Earth's medium are minimized, enabling the occurrence of reliable, secure, and efficient power transfer.

SUMMARY OF THE INVENTION

The Global Interface System (GIS), referred to as the "invention" herein, addresses these needs by establishing a waveguide between the source and the load through synchronized carrier waves designed with desired field strength defined by Maxwell's-Heaviside equations, whereby a magnetic core generates the magnetic field strength, and a Quicklime Copper variable resistance and capacitance tuning method, tunes the magnetic field strength to create the desired electromagnetic waves required to synchronize the invention with the Earth's proton precision frequencies.

The following terms will be used herein to describe the invention and apparatus: 1. carrier wave refers to a wave of fixed amplitude and frequency that is modulated in amplitude, frequency, or phase in order to carry a signal in power transmission, 2. Maxwell's-Heaviside equations are governing equations describing the behavior of electric and magnetic fields and how they relate to each other, 3. Global Interface Power Module (GIPM) is a magnetic core comprising a stator circuit which is placed within a rotor to generate a magnetic field using Maxwell's-Heaviside equations, 4. Quicklime Copper and Capacitance Tuner, referred to as the tuning apparatus herein, is a composition of a variable tuning resistance, derived from chemical reactions generated by combining quicklime and a catalyst (water) and copper, and a precision tuning capacitance required to generate Earth's proton precision frequencies.

According to one embodiment, a system for generating free and renewable energy at the source and distributing the energy to the load, whereas, a waveguide synchronized with the Earth's proton precision frequency is established, via the Global Interface System, comprises: a residential power distribution center, a Global Interface Module, a Quicklime Copper and Capacitance Tuner, a full-wave bridge rectifier, undervoltage and overvoltage relay protection, a battery bank, a power inverter, and a power diverter with flyback diode protection.

According to one process of the embodiment, a free and renewable energy source is generated by, and distributed from the Global Interface System to the load by the following method: The residential power distribution center, the load, electrically connected to the power inverter and power diverter with flyback diodes, whereby, the power inverter converts the output DC power from the GIS to usable AC power for the load, and the power diverter with flyback diodes diverts excessive generated energy by the GIS into the power distribution center for use and, or, storage. The power inverter, electrically connected to the battery bank, whereby, stored DC power is transferred from the battery bank to the power inverter. The undervoltage and overvoltage protection relays, electrically connected to the battery bank, the full-wave bridge rectifier, and the power diverter, whereby, constant DC power is transferred from the full-wave bridge rectifier to the battery bank and excessive DC power is transferred from the protection relays to the power diverter. The full-wave bridge rectifier, electrically connected to the GIPM stator circuit, receives AC power from the GIPM and converts the power to DC. The GIPM generates the desired field strength by incorporating Maxwell's-Heaviside equations into the design specifications of the GIPM's stator and rotor. The GIPM rotor, electrically connected to the tuning apparatus, transfers the desired field strength to the tuning apparatus, whereby, the tuning apparatus utilizes variable resistance and capacitance to precisely tune the field strength for synchronization with the Earth's proton precision frequency. Thus, establishing a free and renewable energy source transferrable to existing power distribution infrastructure or to analogous micro-grids via a synchronized RF between the Global Interface System and the Earth's proton precision frequencies.

According to one embodiment, a process synchronizing generated field strength to desired proton precision frequency, via precision variable resistance and capacitance tuning apparatus, is established by an inorganic composition of quicklime and water as a catalyst, whereby, the chemical reaction between the quicklime (CaO) and water ($H_2O$), creating byproducts of calcium hydroxide ($Ca(OH)_2$) and heat, coupled, with electrolosis of copper within the quicklime, varies the resistance value of the quicklime, creating an inorganic tuning resistance, coupled with a variable capacitance, whereby, the capacitance precisely sets the generated field strength to the resonance frequency.

While the said invention and tuning apparatus are susceptible of embodiments in many different forms, there is shown in the drawings and will herein be described an example of the invention. The presently preferred embodiment of the present invention and tuning apparatus are explained in the following detailed description with supporting drawings and by way of an example which provides a concise understanding of the said invention and tuning apparatus. It is not intended to limit the broad aspect of the invention and tuning apparatus to the illustrated embodiments. So it is to be understood that the same or equivalent functions and sequences may be accomplished by different embodiments that are also intended to be encompassed with the spirit and scope of the invention and tuning apparatus.

BRIEF DESCRIPTION OF DRAWINGS

FIGS. 4-8 are given for clarity.

DETAILED DESCRIPTION OF THE PREFERRED EMBODIMENT

Figure 1:
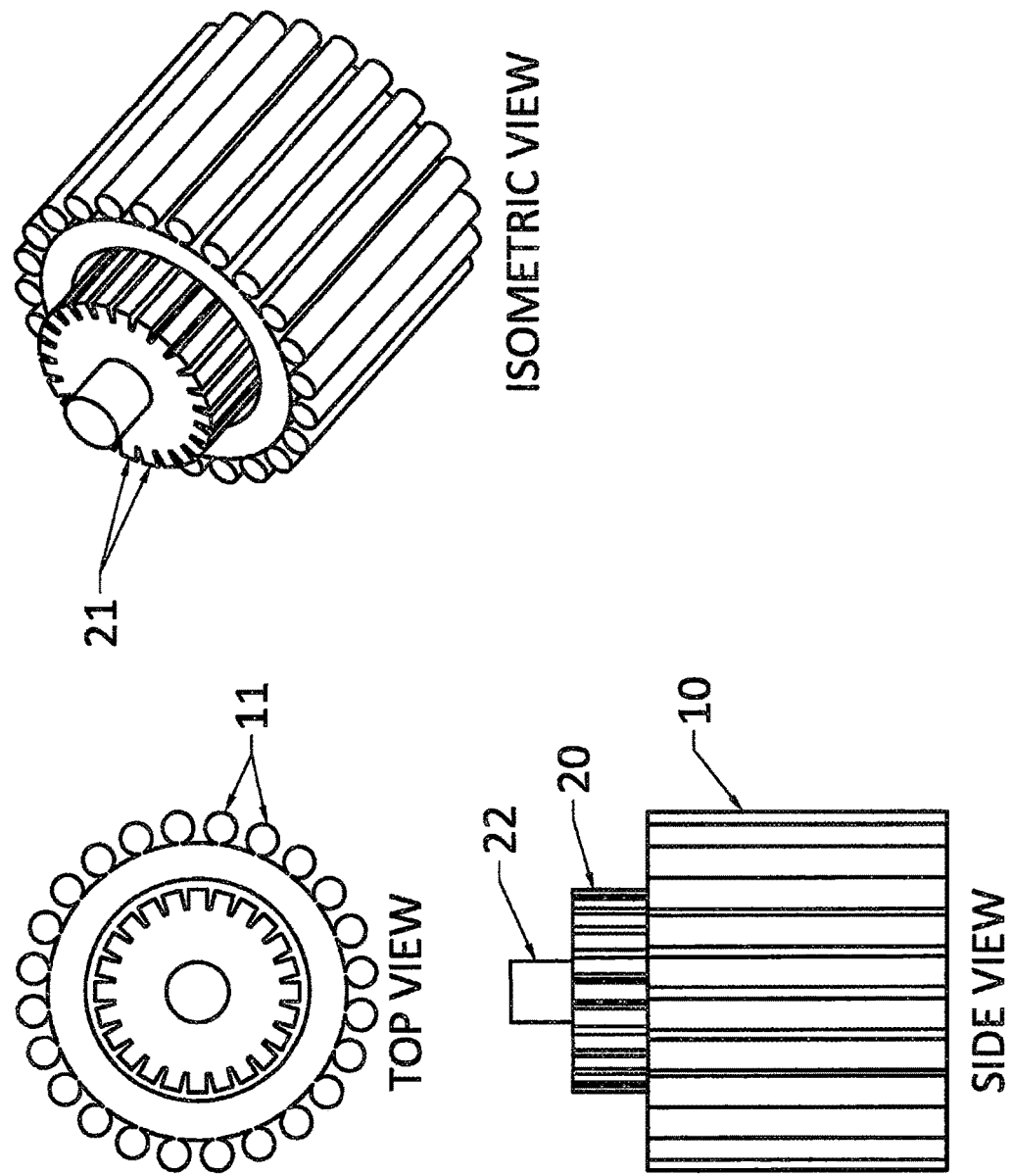
FIG. 1 discloses a top, side, and isometric view of a simplified representation of the Global Interface Power Module's (GIPM) comprised of the stator constructed with twenty-four coils comprised of N-turns wrapped in alternating CCW and CW methods, the rotor comprised of twenty-four, V-shaped magnets with alternating polarities, and a slip ring. which establishes power when power is connected to complete the circuit.
Figure 3:
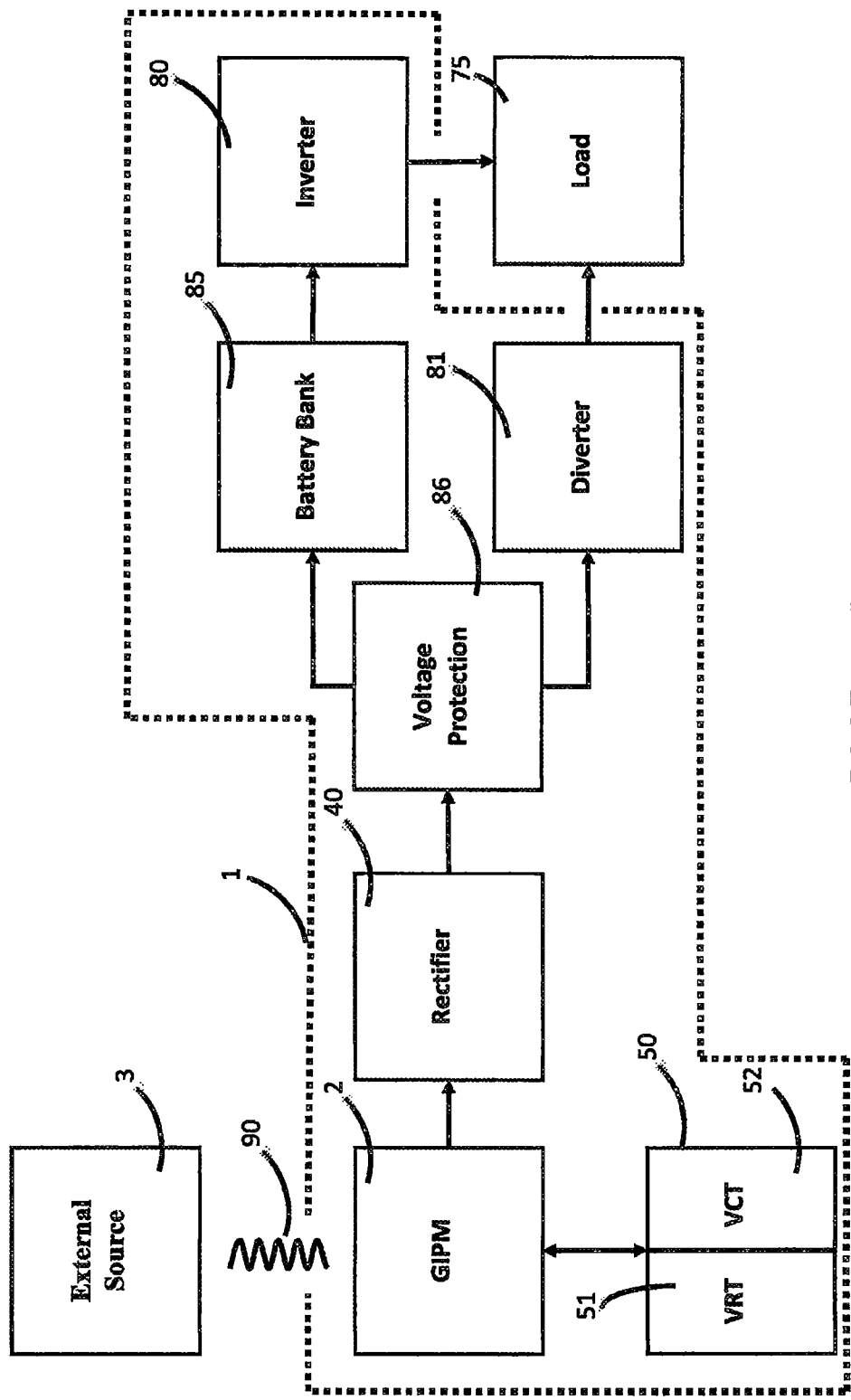
FIG. 3 discloses a detailed block diagram of the electrical connections of one embodiment of the present invention.
Figure 4:
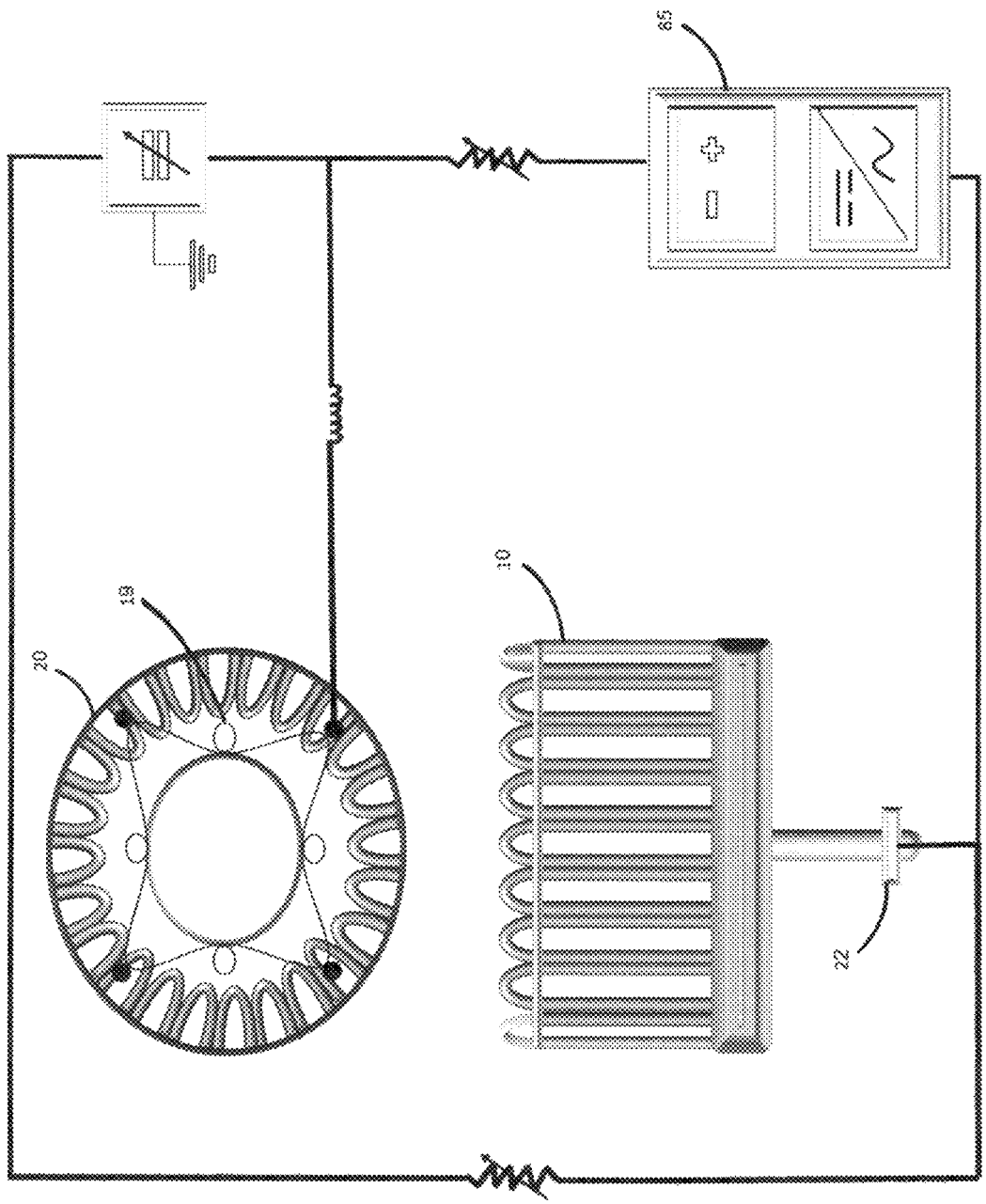
Figure 5:
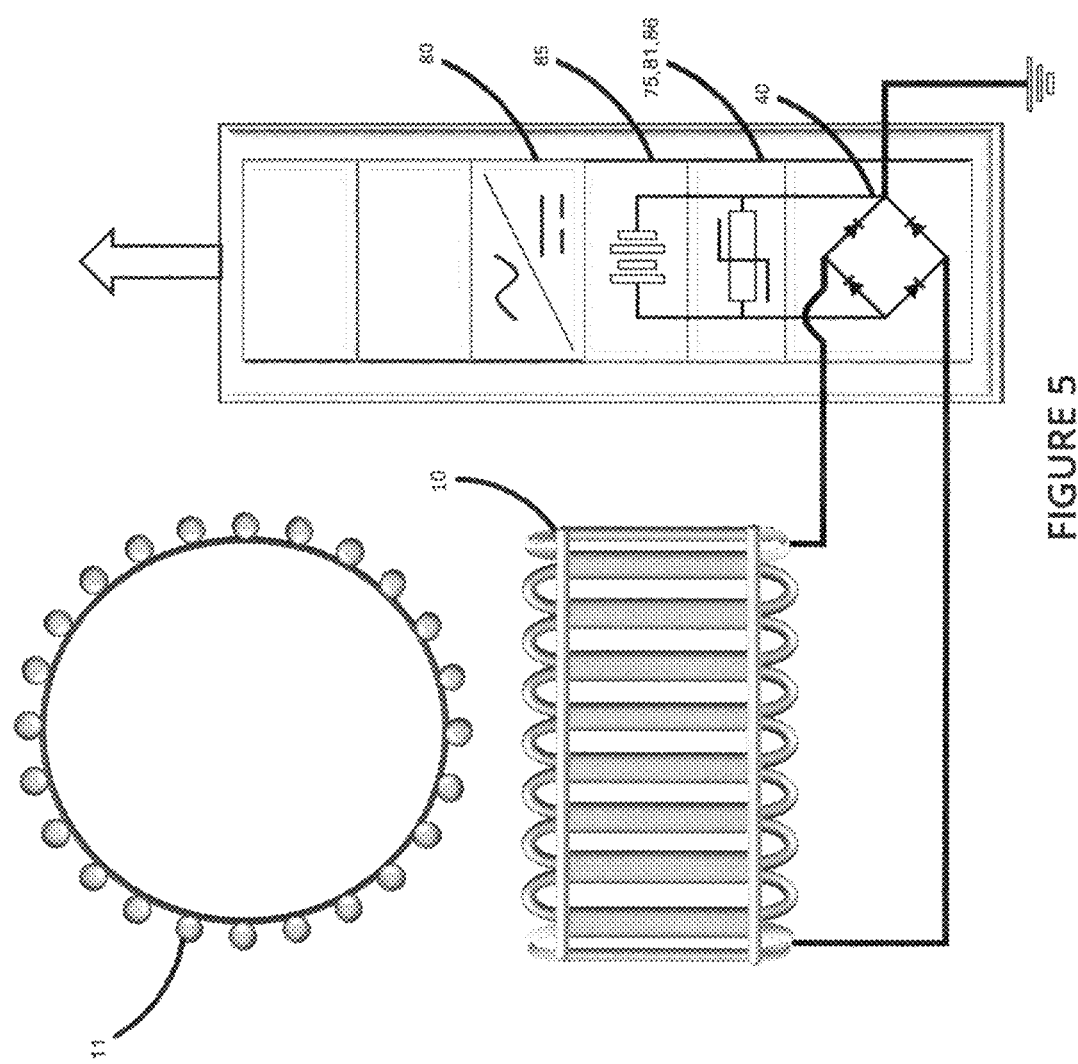
Figure 6:
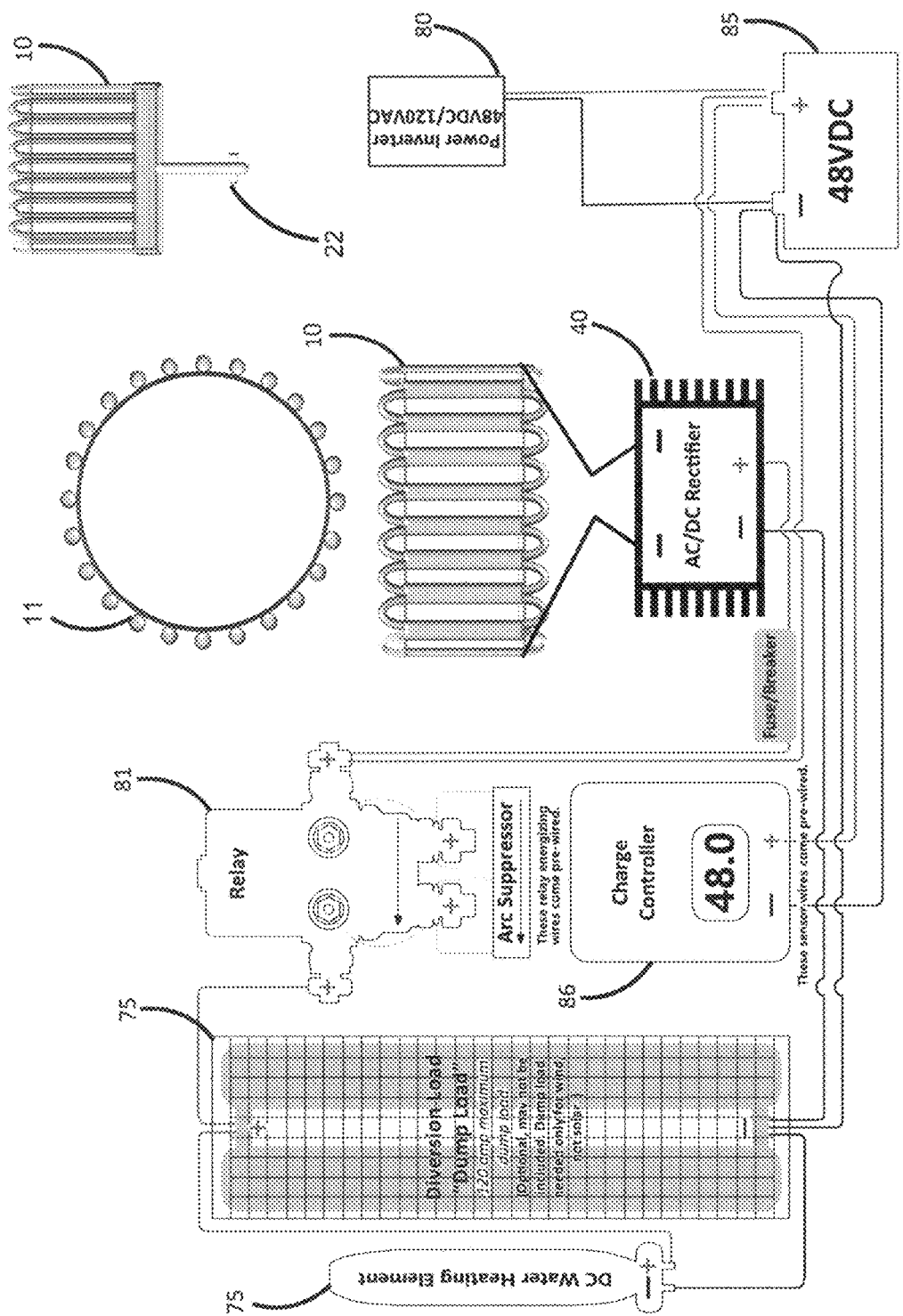

Reference is now made to FIG. 1, which illustrates top, side, and isometric view of the Global Interface Power Module (GIPM) 2. The stator 10 is comprised of 24 coils 11 with N equal to 200 turns of 16awg wire wrapped in alternating CCW and CW methods, thus, creating an alternate field polarity. The 24 coils 11 are electrically connected in series utilizing an alternate field polarity (p-n-p-n . . . ). The stator coils 11 are electrically connected to the full-wave bridge rectifier 40, as illustrated in FIG. 3.

Continued reference is made to FIG. 1, the rotor 20 is comprised of 24 shaped magnets 21 with alternating polarities (NN-SS-NN-SS . . . ), whereas, the magnets 21 form antenna arrays to transmit and receive decibels during frequency synchronization. The slip ring 22 is electrically connected to the variable capacitance tuner 51 for precision tuning, whereas, the variable resistance tuner 52 is electrically connected to the base of the GIPM 50, as illustrated in FIG. 3.

Reference is now made to the synchronizing frequency principle as depicted within the invention. To achieve a desired frequency utilizing the GIPM 2 constant resistance reading of $4.67962519294647 \times 10^{-14}$ ohms, measured from the variable resistance tuner 51 through the GIPM ring mechanically connected to the GIPM base, the GIPM base shall be secured into quicklime with bolts. The resistance reading is necessary for transmitting the required 11298.2789075832 watts to the bolts, whereby, establishing a synchronized frequency of 300.8717 MHz. Alternate embodiments achieving the desired synchronized frequency, i.e. 37.44 MHz, 70.81 MHz, 103.099 MHz, 1.15 GHz, by application of the same variable resistance principle, all embodiments utilizing such principles are within the spirit and scope of the described invention. Reference is now made to formulas for resonant frequencies and power transfer, in dBm, for known elements on the periodic table to provide necessary information regarding calculating resonant frequencies as a function of variable resistance and capacitance, thereby, establishing a correlation between the resonant frequency and distinct distribution distance necessary to generate a desired carrier wave with maximum power transfer between the source and the load.

Wherein, frequency is defined as: $f = 1/2\pi\tau$ where $\tau = 1/CR$

Wherein, frequency magnetic field is defined as: H with angular velocity $\omega$ Wherein, resonance frequency is defined by the angular velocity of H (w) synchronizing with the angular velocity of the magnetic field generated by the external energy source.

Figure 2:
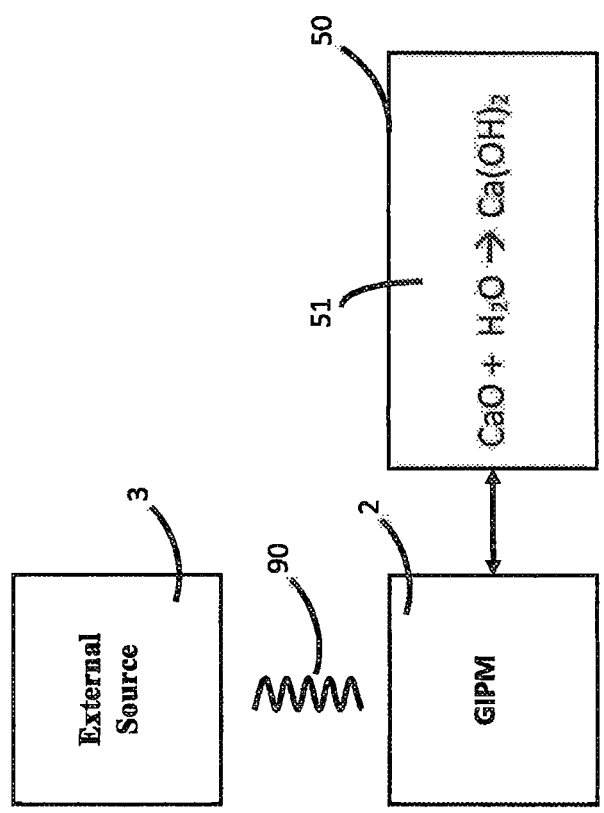
FIG. 2 discloses a block diagram of the chemical reaction between quicklime and water, electrolosis of copper 53 and iron alloy 54, with the internal electrical connection of the present tuning apparatus between the variable resistance and capacitance. As by which distancing the rods 19, within the quicklime and copper a variable resistance occurs.

Reference is now made to FIG. 2, which illustrates a block diagram of the chemical reaction between quicklime and water with the internal electrical connection of the present tuning apparatus 50 between the variable resistance 51 and capacitance 52. Quicklime (CaO) is utilized to introduce a resistance into the RC circuit, whereby, the chemical reaction between quicklime, water and copper, attunes the resistance of the RC circuit to create the desired time constant T. Moreover, a magnet is solidified into the quicklime to generate a desired resistance and conductivity through the quicklime while maintaining a constant humidity level, whereby said magnet is a V-shaped. Additionally, a rod 19 will be solidified within the quicklime to create an induction point required to synchronize the frequency output of the tuner with that of the external source.

Figure 8:
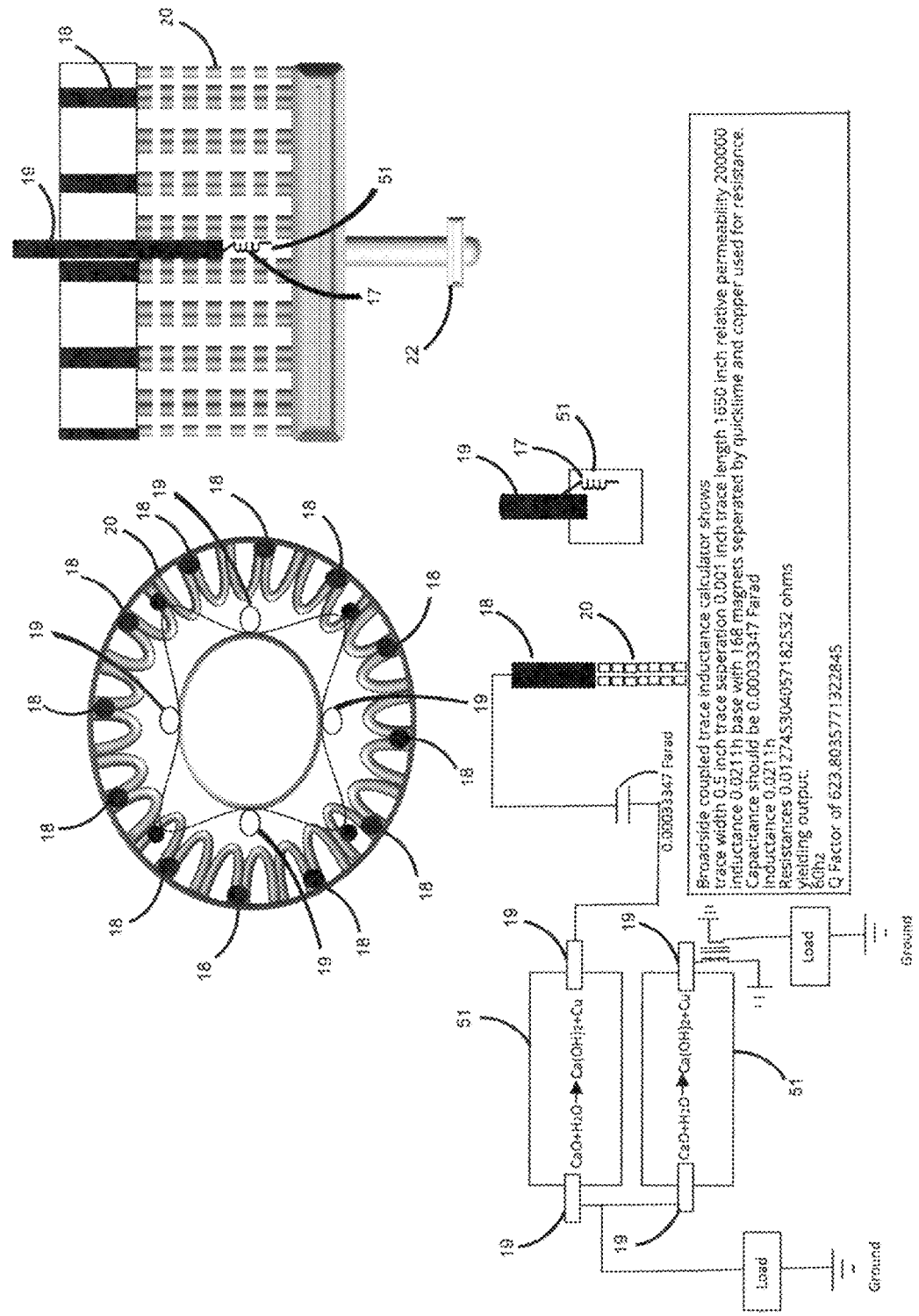

Thereby, the hydrated quicklime will attune within the resistance, distance, width, and height required to generate a cone shape into the upper atmosphere at a frequency of 300.871 MHz. As needed the resistance frequency and capacitance can be adjusted to maintain the synchronized frequency. Rod 19. attached to filament 17. will be electrically connected through quicklime and copper 51 to generate thermionic emissions for electron bunching, this connects to rod 18, for the RLC circuit shown in FIG. 8 and generates a usable 60 hz frequency.

For a more complete understanding of the preferred embodiment of the Global Interface System 1 of the present invention, an example utilizing a power distribution center 75, the load, will be presented. Reference to FIG. 3 is now made, which illustrates one embodiment of the process of the present invention incorporating the following electrical connection methodology. The residential power distribution center 75, the load, electrically connected to the power diverter with flyback diodes 81, whereby, the power inverter 80 converts the output DC power from the GIS 1 to usable AC power for the, and the power diverter with flyback diodes 81 diverts excessive generated energy by the GIS 1 into the power distribution center 75 for use and, or, storage for overvoltage spikes. The power inverter 80, electrically connected to the battery bank 85, whereby, stored DC power is transferred from the battery bank 85 to the power inverter 80. The undervoltage and overvoltage protection relays 86, electrically connected to the battery bank 85, the full-wave bridge rectifier 40, and the power diverter 81, whereby, constant DC power is transferred from the full-wave bridge rectifier 40 to the battery bank 85 and excessive DC power is transferred from the protection relays 86 to the power diverter 81. The full-wave bridge rectifier 40, electrically connected to the GIPM's 2 stator Circuit 10, receives AC power from the GIPM 2 and converts the power to DC. The GIPM 2 generates the desired field strength by incorporating Maxwell's-Heaviside equations into the design specifications of the GIPM's stator 10 and rotor 20. The GIPM rotor 20, electrically connected to the tuning apparatus 50, transfers the desired field strength to the tuning apparatus 50, whereby, the tuning apparatus 50 utilizes variable resistance 51 and capacitance 52 to precisely tune the field strength for synchronization with the external source's 3 proton precision frequency 90. Said desired field strength is a weak oscillating magnetic field (H') generated by the GIPM 2 to be superimposed on the strong constant magnetic field (H) generated by the external source 3. Whereas, H' is defined as a vector with amplitude and direction, rotating perpendicular to the direction of H with an angular velocity of w. The superimposed field is precisely tuned to establish a resonance frequency 90 with the external source 3, whereby increasing the energy state of the system results in energy being extracted from the superimposed field through the GIPM 2 with tuning apparatus 50. The extracted energy is transferred from the GIPM's stator circuit 10 to bridge rectifier 40 and protection circuits to create usable energy. Thus, establishing a free and renewable energy source transferrable to existing power distribution center, load, 75 or to analogous micro-grids, not shown, via a synchronized, resonance, RF between the Global Interface System 1 and the external source 3.

While the foregoing has described what is considered to be the best mode and/or other examples, it is understood that various modifications may be made therein and that the subject matter disclosed herein may be implemented in various forms and examples, and that they may be applied in numerous other applications, combinations and environments, only some of which have been described herein. Those of ordinary skill in that art will recognize that the disclosed aspects may be altered or amended without departing from the true spirit and scope of the subject matter. Therefore, the subject matter is not limited to the specific details, exhibits and illustrated examples in this description. It is intended to protect any and all modifications and variations that fall within the true scope of the advantageous concepts disclosed herein.

What is claimed is:

1. A magnetic resonance frequency energy system for generating and distributing free and renewable energy to a load, comprising:
   a magnetic resonance frequency generator wirelessly connected through resonant magnetic waves to a desired magnetic field generated by an external energy source and electrically connected to the load via an electrical system, wherein the electrical system comprises:
   a rectifier electrically connected to the magnetic resonance frequency generator and to voltage protection circuits;
   a battery bank electrically connected to an inverter and to the voltage protection circuits, wherein the inverter is directly connected to the load; and
   a diverter electrically connected to the voltage protection circuits and to the load,
   wherein energy stored within the magnetic field generated by the external energy source is at least 40.2 MW and the energy stored is extracted by the magnetic resonance frequency generator and transferred to the load via the diverter and the inverter of the electrical system,
   wherein the magnetic resonance frequency generator is set at a frequency of 300.8717 MHz, 37.44 MHz, 70.81 MHz, 103.099 MHz, or 1.15 GHz to extract the energy stored within the magnetic field generated by the external energy source.

2. The magnetic resonance frequency system of claim 1, wherein the desired magnetic field generated by an external source is the magnetic field generated by and extracted from a dipolar energy source is the Earth.

3. The magnetic resonance frequency system of claim 1, wherein the load is a component that consumes power from the system one of micro-grid, power distribution tower, or power, distribution center.

4. The magnetic resonance frequency energy system of claim 1, wherein the resonant magnetic waves comprise a frequency of 300.8717 MHz, 37.44 MHz, 70.81 MHz, 103.099 MHz, or 1.15 GHz.

5. A method for generating and distributing free and renewable energy to a load, comprising:

wirelessly connecting a magnetic resonance frequency generator through resonant magnetic waves to a desired magnetic field generated by an external energy source;

electrically connecting the magnetic resonance frequency generator to the load via an electrical system;

extracting, by the magnetic resonance frequency generator, energy stored within the magnetic field generated by the external energy source, wherein the magnetic resonance frequency generator is set at a frequency of 300.8717 MHz, 37.44 MHz, 70.81 MHz, 103.099 MHz, or 1.15 GHz for the extracting of the energy stored within the magnetic field generated by the external energy source; and transferring, by the magnetic resonance frequency generator, the energy stored to the load via the electrical system, wherein the electrical system comprises:

a rectifier electrically connected to the magnetic resonance frequency generator and to voltage protection circuits;

a battery bank electrically connected to an inverter and to the voltage protection circuits, wherein the inverter is electrically connected to the load; and a diverter electrically connected to the voltage protection circuits and to the load, wherein the transferring of the energy stored to the load, by the magnetic resonance frequency generator, is performed via the diverter and the inverter of the electrical system.

6. The method of claim 5, wherein the resonant magnetic waves comprise a frequency of 300.8717 MHz, 37.44 MHz, 70.81 MHz, 103.099 MHz, or 1.15 GHz.

7. The method of claim 5, wherein the load is a component that consumes power from the system one of microgrid, power distribution tower, or power distribution center.

\* \* \* \* \*